United States Patent
Focke et al.

(12) 
(10) Patent No.: US 6,619,012 B2
(45) Date of Patent: Sep. 16, 2003

(54) APPARATUS FOR THE HEAT SEALING OF FOLDING FLAPS, AND MECHANISM FOR ACTUATING SEALING ELEMENTS

(75) Inventors: Heinz Focke, Verden (DE); Burkard Roesler, Blender (DE)

(73) Assignee: Focke & Co. (GmbH & Co.) (DE)

( * ) Notice: Subject to any disclaimer, the term of this patent is extended or adjusted under 35 U.S.C. 154(b) by 28 days.

(21) Appl. No.: 09/753,597

(22) Filed: Jan. 3, 2001

(65) Prior Publication Data

US 2001/0005969 A1 Jul. 5, 2001

(30) Foreign Application Priority Data

Jan. 3, 2000 (DE) .......................................... 100 00 052

(51) Int. Cl.[7] ............................................. B65B 51/14
(52) U.S. Cl. ..................................... 53/374.9; 53/371.9
(58) Field of Search ............................. 53/374.9, 375.2, 53/374.8, 372.7, 372.6, 371.9; 156/308.4, 583.2, 583.1

(56) References Cited

U.S. PATENT DOCUMENTS

| | | | |
|---|---|---|---|
| 2,656,658 A | * 10/1953 | Grady | 53/576 |
| 3,332,204 A | * 7/1967 | Frank | 53/374.9 |
| 3,589,100 A | * 6/1971 | Konars et al. | 53/229 |
| 3,777,454 A | * 12/1973 | Van Manen | 53/374.9 |
| 4,241,560 A | 12/1980 | Deimel et al. | |
| 4,433,527 A | * 2/1984 | Ramsey et al. | 156/583.1 |
| 4,622,798 A | 11/1986 | Oki | |
| 5,247,779 A | * 9/1993 | Wirsig et al. | 53/373.7 |
| 5,351,464 A | * 10/1994 | Francioni | 53/450 |
| 5,788,378 A | * 8/1998 | Thomas | 383/104 |
| 5,890,347 A | * 4/1999 | Giacomelli et al. | 156/580.1 |

FOREIGN PATENT DOCUMENTS

| | | | |
|---|---|---|---|
| CH | 380364 | * | 7/1964 |
| DE | 27 40 176 | * | 11/1976 |
| DE | 28 12 138 | * | 1/1983 |
| DE | 94 13 035 | * | 1/1996 |
| GB | 2 107 041 A | | 10/1979 |
| GB | 1576540 | | 10/1980 |

OTHER PUBLICATIONS

German Search Report.

* cited by examiner

*Primary Examiner*—Rinaldi I. Rada
*Assistant Examiner*—Paul Durand
(74) *Attorney, Agent, or Firm*—Thomas, Kayden Horstemeyer & Risley LLP; Todd Deveau

(57) ABSTRACT

Apparatus for sealing thermoplastic sheet materials or for closing packs, such as bags, made of such sheet materials with the aid of heated sealing jaws (22) and mating jaws (25), which accommodate between them the sheet materials and/or folding or closing flaps which are to be connected, the (non-heated) mating jaw (25) having an elastically deformable abutment surface for the sheet materials which are to be sealed, such that any possible elevations produced by a multi-layered design of the folding or closing flaps are compensated for by the elasticity of the abutment surface of the mating jaw. The sealing jaw (22) and/or mating jaw (25) can be moved by a special, oil-free actuating mechanism which, during continuous driving, brings about a standstill phase of the sealing jaw or mating jaw, which can be moved back and forth.

20 Claims, 4 Drawing Sheets

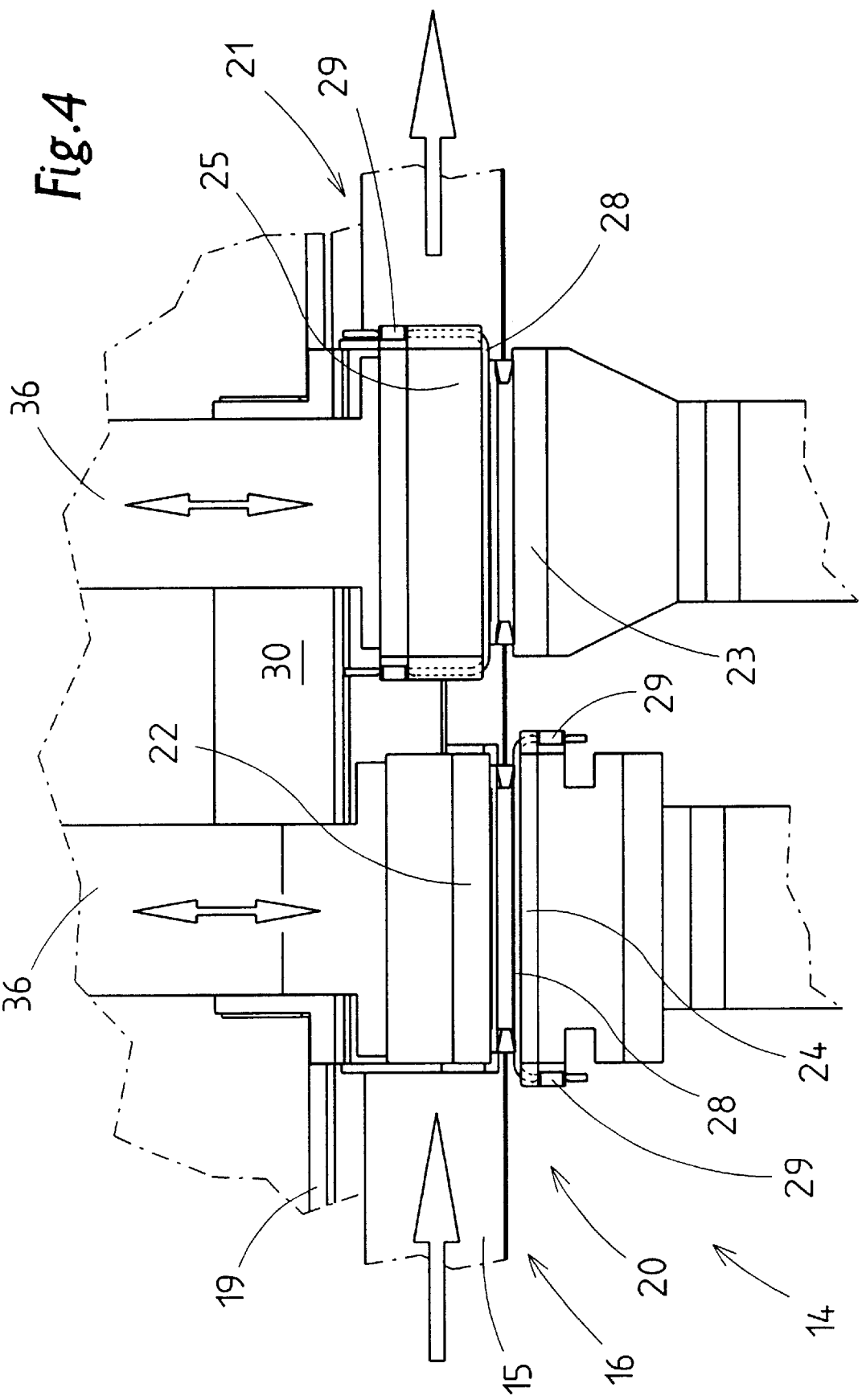

APPARATUS FOR THE HEAT SEALING OF FOLDING FLAPS, AND MECHANISM FOR ACTUATING SEALING ELEMENTS

FOREIGN APPLICATION PRIORITY DATA

The present application claims the benefit of foreign priority upon German patent application 100 00 052.5, filed Jan. 3, 2000

BACKGROUND OF THE INVENTION

1. Field of the Invention

The invention relates to an apparatus for producing and closing packs with multi-layered folding flaps by heat sealing with the aid of heated sealing jaws, in particular for closing (sheet-material) bags with closing flaps. The invention also relates to a mechanism for cyclically actuating sealing elements or similar tools.

2. Description of Related Art

The operation of sealing thermoplastic sheet materials poses difficulties if the surfaces which are to be sealed are of non-uniform thicknesses. This applies to folding flaps or closing flaps of packs or bags which on account of folds, in sub-regions, are of multi-layered construction.

BRIEF SUMMARY OF THE INVENTION

The object of the invention is to propose an apparatus which is intended for sealing folding flaps, closing flaps or the like and is suitable, in particular, for compensating for regions of the folding or closing flaps which are of different thicknesses such that a uniform sealing surface or sealing seam is provided despite these differences in thickness.

In order to achieve this object, the apparatus according to the invention is characterized by the following features:

a) the packs or bags can be conveyed cyclically through a sealing station with a plurality of successive units comprising a heated sealing jaw, on the one hand, and (non-heated) mating jaw, on the other hand, between which the folding or closing flaps are accommodated for sealing purposes, b) from unit to unit, the sealing jaws and mating jaws are positioned on alternate sides of folding or closing flaps such that in the region of one unit the sealing jaws are positioned on one side, and in the region of the next unit the sealing jaws are positioned on the opposite side, of the folding or closing flaps.

Favourable sealing results are achieved, in particular, with multi-layered sheet materials or flaps by successive sealing on opposite sides of the sheet material. Particularly precise sealing regions are achieved if, according to the invention, at least the (non-heated) mating jaw has an elastic abutment surface, for example comprising a silicone strip. In this case, that region of the sheet material or of the folding or closing flap which is to be sealed is forced against the elastic region of the mating jaw by the sealing jaw.

A special feature of the invention is a mechanism for actuating the sealing jaw or other elements which can be moved cyclically or back and forth. The mechanism is characterized by the following features:

a) a drive element which is driven continuously in rotation is connected, via a coupling member, to the element or the sealing or mating jaw, b) the coupling member is connected pivotably to the element, on the one hand, and to an intermediate element, on the other hand, c) the intermediate element can be moved by the drive element such that the driven element has a standstill phase during a revolution of the drive element.

The special feature of this mechanism is that entire cam plates which are susceptible to malfunctioning and/or provided with special lubrication and are intended for controlling the movement of the sealing jaws or the like are avoided. The crank-like mechanism, which, on account of the special connection to an actuating arm, ensures a standstill phase as rotation proceeds continuously, is of straightforward construction and is not particularly susceptible to malfunctioning.

BRIEF DESCRIPTION OF THE DRAWINGS

Further details of the invention are explained more specifically hereinbelow with reference to exemplary embodiments, in which:

FIG. 4 shows the sealing station according to FIG. 3 in a plan view in accordance with arrow IV.

DETAILED DESCRIPTION OF PREFERRED EMBODIMENTS

Figure 1:
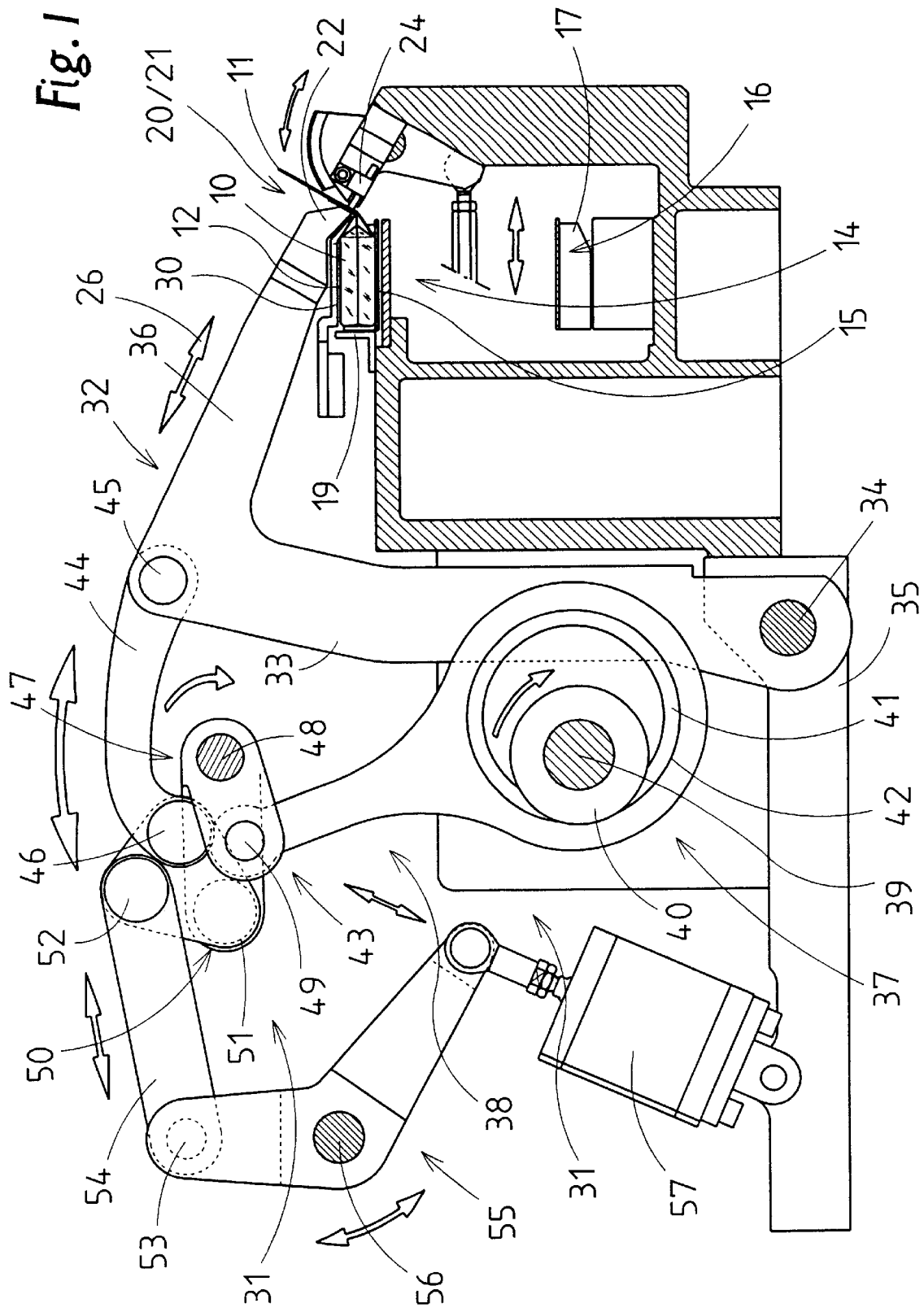
FIG. 1 shows a side view, partially in vertical section, of a sealing apparatus with special mechanism.

The exemplary embodiment illustrated in the drawing relates to the production and closure of specific types of packs, namely of (tobacco) bags 10 made of heat-sealable sheet material. The bag 10 in this case is gusseted. In the region of a removal opening, the bag 10 is provided with an elongate closing flap. This is folded over against an (upwardly directed) front side 12 of the bag 10 and connected to the front side 12, for example, by a tape or the like.

The closure flap 11 is connected to a (shorter) mating flap 13. The closing flap 11 and mating flap 13 are connected to one another along a continuous, strip-like sealing seam by the transmission of heat and pressure.

The bag 10 or the sheet material thereof may be designed such that the walls, including the closing flap 11 and mating flap 13, comprise in each case outer layers of thin sheet material and a paper blank positioned therebetween. However, it is also possible for the bag 10 to be formed from single-layered material.

In the region of the closing flap 11 and mating flap 13, a gusset produces a multi-layered region on the border side. The gusset is folded inwards in the form of a V or M in this region. In this region, the closing flap 11 and mating flap 13 thus form at least four layers, and they form two layers outside this region. The sealing seam is intended to extend over the entire width of the opening, that is to say also in the region of the V-shaped or M-shaped fold.

In order to produce the sealing seam, the filled and correspondingly prepared bag 10 is conveyed into a sealing station 14. For this purpose, the bags 10 are located on a top strand 15 of an endless pack conveyor 16. The latter is subdivided into pockets by transversely directed partition walls 17. The bags 10 are positioned on the top strand 15 and/or in the pockets such that the closing flap 11 and mating flap 13 are directed sideways and project beyond the pack conveyor 16. A base surface 18 of the bag 10 is directed towards a stationary, angled side guide in the region of the sealing station 14.

Provided in the sealing station 14 are sealing elements which produce the sealing seam in a number of successive sealing cycles, in the present exemplary embodiment in two sealing cycles. The sealing operation is executed by sealing units 20, 21. Each sealing unit 20, 21 comprises a sealing jaw 22, 23 and a mating jaw 24, 25. The sealing jaws 22, 23 are heated in each case. The mating jaws 24, 25 are not heated, and, if appropriate may be cooled.

The bags 10 are transported into the sealing station 14 by corresponding conveying cycles of the pack conveyor 16 such that in each case one bag 10 is located in the region of one sealing unit 20, 21 and the other during the standstill of the pack conveyor 16. The closing flaps 11 of the bags 10, which are located flat on the top strand 15, are directed towards the free side and are located in an oblique upright plane. Correspondingly, the sealing jaws 22, 23, on the one hand, and the mating jaws 24, 25, on the other hand, are positioned in an oblique plane of approximately 30°. The closing flap 11 and mating flap 13 are accommodated in each case between a sealing jaw 22, 23, on the one hand, and a mating jaw 24, 25, on the other hand.

A special feature is that it is only those elements which are arranged on one side of the parts which are to be sealed which can be moved. In the sealing unit 20, the sealing jaw 22 can be moved and the mating jaw 24 is position in a fixed manner. In the sealing unit 21, the mating jaw 25 is arranged on the side of the sealing jaw 22 and can be moved, while the sealing jaw 23, which is positioned alongside the mating jaw 24, is arranged in a fixed manner. The respectively moveable elements can be moved back and forth in the oblique plane in accordance with double arrow 26.

The sealing jaws 22, 23 have a planar, in particular metallic sealing surface 27 in accordance with the seal or sealing seam which is to be produced. The mating jaws 24, 25 are of special design. These have an elastic, compliant pressure-exerting or abutment surface for the sheet material. In the present exemplary embodiment, said abutment surface is formed by a strip 28 of elastic material, in particular silicone. Said strip 28 is positioned in the form of a U over an end surface of the mating jaw 24, 25 and anchored in the region of side surfaces by securing means 29. This configuration of the mating jaw 24, 25 compensates for unevenesses in the region of the surfaces which are to be sealed, in particular on account of gussets. Any possible elevations are forced into the elastically deformable mating element by the (rigid) sealing surface 27 of the sealing jaw 22, 23.

The moveable elements, namely sealing jaw 22, on the one hand, and mating jaw 25, on the other hand, can be moved individually or preferably jointly above the movement path of the bags 10. For protection against undesired heat transmission, a stationary covering 30 is provided above the bags 10 at least in the region of the sealing jaw 22. The sealing jaw 22, and correspondingly the mating jaw 25, is of contoured design in an end region, in adaptation to the form of the bags 10 and/or of the covering 30.

The moveable elements, namely sealing jaw 22 and mating jaw 25, can be moved by a special actuating mechanism 31. The latter comprises a pivotable carrying element for the sealing jaw 22 and/or mating jaw 25. This is an angled, single-armed actuating arm 32. An upright leg 33 remote from the sealing jaw 22 and/or mating jaw 25 is connected pivotably, by a bearing 34, to a carrying apparatus, namely to a (horizontal) carrying plate 35. Another leg 36 serves as carrier for the sealing jaw 22 or mating jaw 25. The leg 36 is connected to the leg 33 at an acute angle, namely such that it is oriented obliquely downwards. During a pivoting movement of the actuating arm 32 about the bearing 34, the leg 36 is moved approximately in the plane marked by double arrow 26.

The actuating arm 32 is connected to the actuating mechanism 31, which is driven continuously in rotation or circulation, in particular by a central machine drive. The actuating mechanism 31 comprises a drive element which is driven continuously in rotation and is in the form of a crank mechanism 37. A crank arm 38 is driven in rotation by a fixed shaft 39. The shaft 39 is positioned in a stationary manner. A ring 40, which is arranged on the shaft 39, is connected to an annular rolling-contact bearing 41. The latter, in turn, is mounted rotateably in a large-format bearing opening 42 of the crank arm 38. During (continuous) rotation of the shaft 39, a corresponding rotary movement is transmitted to the rolling-contact bearing 41 via the ring 40. Said rolling-contact bearing is positioned in an offset or eccentric manner in relation to the shaft 39 with the result that a pendulum movement is transmitted to the crank arm 38.

The crank arm 38 is connected, by a top end, which is remote from the shaft 39, to a coupling mechanism 43 which transmits the uniform, continuous crank movement of the crank mechanism 37 to the sealing jaw 22 and/or mating jaw 25, so as to produce, on the one hand, a back and forth movement of said element and, on the other hand, a temporary standstill of the same, namely during the sealing operation. For this purpose, the coupling mechanism 43 is connected to the actuating arm 32 by a link 44, to be precise in the region of a bearing 45 formed at a corner point of the legs 33, 36.

The other end of the link 44 is likewise connected to the coupling mechanism 43 via a pivot bearing 46.

The coupling mechanism 43 has a (first) coupling member 47. The latter can be pivoted about a fixed bearing 48 in accordance with the movement of the crank arm 48. In the present case, the coupling member 47 can be rotated in the clockwise direction about the fixed bearing 48.

The end of the crank arm 38 is connected to the coupling member 47 via a rotary bearing 49, to be precise at a distance from the fixed bearing 48.

A rotary bearing 51 connects the (first) coupling member 47 to a (second) coupling member 50. Said rotary bearing 51 is arranged at a distance both from the fixed bearing 48 and from the rotary bearing 49. The coupling member 50 is of more or less triangular design. First of all, the link 44 is connected to said coupling member 50 via the pivot bearing 46. Furthermore, a bearing 52 provides a fixed point for the coupling mechanism 43. This is a (further) fixed bearing 53, to which the coupling mechanism 43 is connected via a further link 54. Accordingly, the coupling member 50 is mounted in a freely moveable manner, namely in each case such that it can be rotated or pivoted about the bearings 46, 51, 52. The link 54 can also be pivoted about the fixed bearing 53 in this case.

Figure 2:
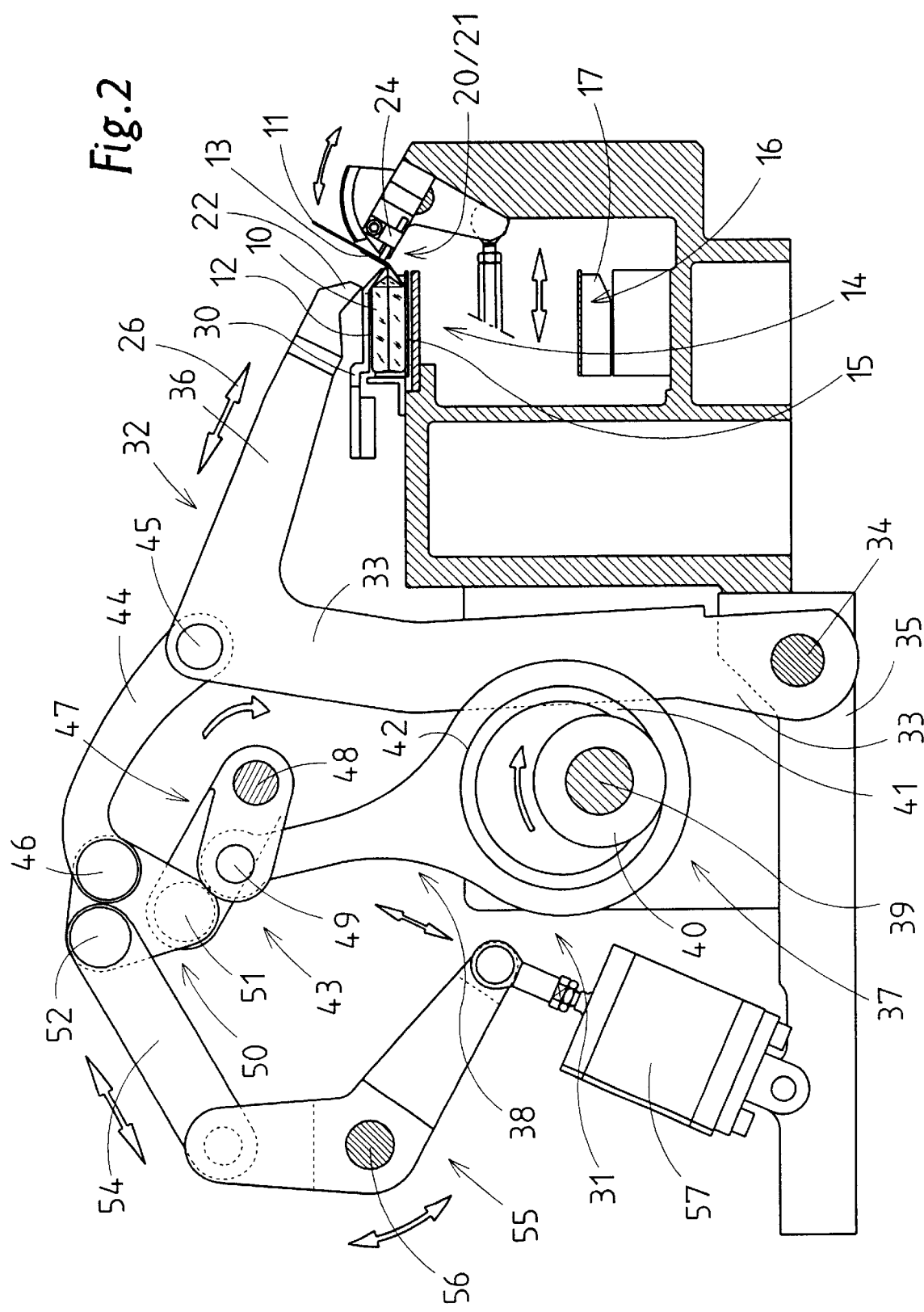
FIG. 2 shows the apparatus according to FIG. 1 with the relative positioning of elements changed.

FIGS. 1 and 2 show two different positions of the actuating mechanism 31. The interaction of the abovedescribed elements achieves the situation where, in the position according to FIG. 1, despite continued rotary movement of the shaft 39 and the crank mechanism 37, the leg 36, and thus the sealing jaw 22 or the mating jaw 25, is at a temporary standstill, namely for the purpose of executing a sealing cycle.

A further special feature is that the entire actuating mechanism 31, including actuating arm 32 with sealing jaws 22 and/or mating jaws 24, can be moved out of the operating position, in particular for maintenance or repair purposes. For this purpose, the fixed bearing 53 is connected to a restoring mechanism, namely a (two-armed) actuating lever 55. The latter can be pivoted about a pivot bearing 56. By corresponding actuation of the actuating lever 55, the fixed bearing 53 is drawn back, the actuating mechanism 31 being carried along in the process. Provided for this movement is a pressure-medium cylinder 57, which acts on the free end of the actuating lever 55 by way of a piston rod.

The actuating mechanism 31 which has been described in terms of construction and functioning may also be used for the actuation and/or movement of other elements with a corresponding requirement profile.

Figure 3:
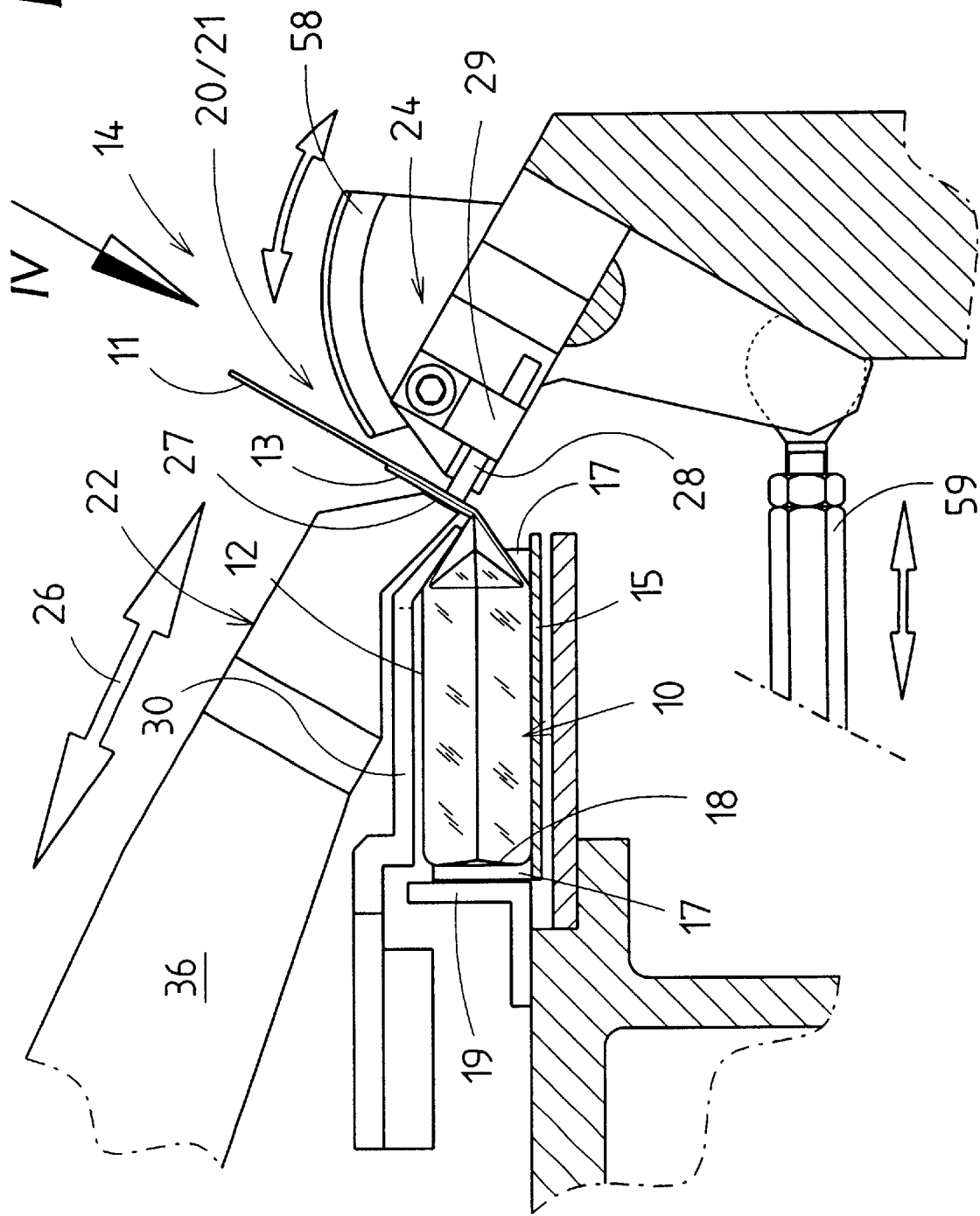
FIG. 3 shows, on an enlarged scale, a sealing station as a detail of FIG. 1.

Following the sealing station 14, the unit comprising the closing flap 11 and mating flap 13, said unit being formed by sealing, is folded over against the free front side 12 of the bag 10 and fixed by adhesive bonding or by tape. For this purpose, it is possible to see a segment-like folding element 58 which is illustrated in FIG. 3, in particular, and can be pivoted by a push rod 59 in order to fold over the closing flap 11.

List of Designations

10 Bag
11 Closing flap
12 Front side
13 Mating flap
14 Sealing station
15 Top strand
16 Pack conveyor
17 Partition wall
18 Base surface
19 Side guide
20 Sealing unit
21 Sealing unit
22 Sealing jaw
23 Sealing jaw
24 Mating jaw
25 Mating jaw
26 Double arrow
27 Sealing surface
28 Strip
29 Securing means
30 Covering
31 Actuating mechanism
32 Actuating arm
33 Leg
34 Bearing
35 Carrying plate
36 Leg
37 Crank mechanism
38 Crank arm
39 Shaft
40 Ring
41 Rolling-contact bearing
42 Bearing opening
43 Coupling mechanism
44 Link
45 Bearing
46 Pivot bearing
47 Coupling member
48 Fixed bearing
49 Rotary bearing
50 Coupling member
51 Rotary bearing
52 Bearing
53 Fixed bearing
54 Link
55 Actuating lever
56 Pivot bearing
57 Pressure-medium cylinder
58 Folding element
59 Push rod

What is claimed is:

1. Apparatus for closing packs with multi-layered folding flaps by heat sealing comprising:
    a sealing station, the sealing station incorporating a first sealing unit and a second sealing unit arranged successively in a conveying direction of the packs, each sealing unit having a heated sealing jaw and a non-heated mating jaw, each sealing unit having an open position wherein the sealing jaw is distant the mating jaw, and a sealing position wherein the sealing jaw is proximate the mating jaw;
    a pack conveyor for conveying the packs through the sealing station;
    the first sealing unit having the sealing jaw on a first side of the conveyor, and the mating jaw on a second side of the conveyor, and the second sealing unit having an opposite orientation of the sealing jaw and mating jaw, wherein the sealing jaw of the second sealing unit is on the second side of the conveyor, and the mating jaw of the second sealing unit is on the first side of the conveyor; and
    wherein the folding flaps of the packs are initially positioned by the pack conveyor in between the sealing jaw and mating jaw of a sealing unit when the sealing unit is in the open position, after which the sealing unit moves to the sealing position whereupon the folding flaps are sealed to one another.

2. Apparatus according to claim 1, wherein the mating jaw of each sealing unit has an elastically deformable abutment surface for the folding flaps of the packs, the folding flaps being forced against the elastically deformable abutment surface of the mating jaw by the sealing jaw when the sealing unit is in the sealing position.

3. Apparatus according to claim 2 further comprising a securing assembly, and
    wherein the elastically deformable abutment surface of the mating jaws includes a strip of elastic, heat-resistant material, the strip extending over the entire length of the mating jaw and being anchored laterally in a releasable manner by the securing assembly.

4. The apparatus according to claim 2, wherein the elastically deformable abutment surface of the mating jaw is a coating made of elastically deformable, heat-resistant material.

5. The apparatus according to claim 4, wherein the coating of the mating jaw comprises silicone.

6. Apparatus according to claim 1, wherein the sealing jaws and the mating jaws are each directed obliquely—at an angle of approximately 30°—to the conveying plane of the pack.

7. Apparatus according to claim 1, wherein the jaws positioned on one side of the conveyor are connected to one another to form an actuating unit and are moved jointly by an actuating mechanism.

8. Apparatus according to claim 1 further comprising:
    an actuating arm mounted in a stationary manner such that it can be pivoted;
    a drive element driven continuously in rotation and connected, via the actuating arm, to at least one of the sealing jaw and the mating jaw of each of the sealing units; and a coupling mechanism connecting the actuating arm to the drive element, such that the at least one of the sealing jaw and the mating jaw has a standstill phase during a revolution of the drive element.

9. Apparatus according to claim 8, wherein the drive element is mounted on a shaft, and further comprising a crank arm, the crank arm pivotably connected to a first coupling member of the coupling mechanism, the first coupling member being pivotable about a fixed bearing and being connected to a second coupling member of the coupling mechanism.

10. Apparatus according to claim 9, wherein the coupling mechanism is pivotably connected via an intermediate member to the actuating arm.

11. Apparatus according to claim 9, wherein the coupling mechanism is connected to a fixed bearing.

12. Apparatus according to claim 8, wherein the actuating arm is pivoted by an actuating mechanism with a pressure-medium cylinder.

13. Apparatus for closing packs with multi-layered folding flaps by heat sealing comprising:
 a sealing station, the sealing station incorporating a first sealing unit and a second sealing unit arranged successively in a conveying direction of the packs, each sealing unit having a heated sealing jaw and a non-heated mating jaw, each sealing unit having an open position wherein the sealing jaw is distant the mating jaw, and a sealing position wherein the sealing jaw is proximate the mating jaw;
 a pack conveyor for conveying the packs through the sealing station;
 the first sealing unit having the sealing jaw on a first side of the conveyor, and the mating jaw on a second side of the conveyor, and the second sealing unit having an opposite orientation of the sealing jaw and mating jaw, wherein the sealing jaw of the second sealing unit is on the second side of the conveyor, and the mating jaw of the second sealing unit is on the first side of the conveyor; and
 wherein the folding flaps of the packs are initially positioned by the pack conveyor in between the sealing jaw and mating jaw of a sealing unit when the sealing unit is in the open Q position, after which the sealing unit moves to the sealing position whereupon the folding flaps are sealed to one another, and
 wherein the jaws of the sealing units on only one of the first and second sides of the pack conveyor move to place the sealing units into the sealing position, wherein the jaws of the sealing units on the other of the first and second sides the pack conveyor remain stationary.

14. Apparatus according to claim 13, wherein the sealing jaw of the first sealing unit, and the mating jaw of the second sealing unit move to place the sealing units into the sealing position, wherein the mating jaw of the first sealing unit and the sealing jaw of the second sealing unit remain stationary.

15. Apparatus according to claim 13, wherein the mating jaw of each sealing unit has an elastically deformable abutment surface for the folding flaps of the packs, the folding flaps being forced against the elastically deformable abutment surface of the mating jaw by the sealing jaw when the sealing unit is in the sealing position.

16. Apparatus according to claim 15 further comprising a securing assembly, and
 wherein the elastically deformable abutment surface of the mating jaws includes a strip of elastic, heat-resistant material, the strip extending over the entire length of the mating jaw and being anchored laterally in a releasable manner by the securing assembly.

17. The apparatus according to claim 15, wherein the elastically deformable abutment surface of the mating jaw is a coating made of elastically deformable, heat-resistant material.

18. The apparatus according to claim 17, wherein the coating of the mating jaw comprises silicone.

19. Apparatus according to claim 13, wherein the sealing jaws and the mating jaws are each directed obliquely to the conveying plane of the pack.

20. Apparatus according to claim 13, wherein the jaws positioned on one side of the conveyor are connected to one another to form an actuating unit and are moved jointly by an actuating mechanism.

* * * * *